United States Patent Office 3,100,775
Patented Aug. 13, 1963

3,100,775
α-PHENYL(PYRIDYL OR PIPERIDYL)ALKYL ESTERS OF (CHLORO OR LOWER ALKOXY)-BENZOIC ACIDS AND CONGENERS
Kurt J. Rorig, Glenview, Ill., assignor to G. D. Searle & Co., Chicago, Ill., a corporation of Delaware
No Drawing. Filed Apr. 1, 1959, Ser. No. 803,371
16 Claims. (Cl. 260—295)

This invention relates to aryl(cyclic amino)alkyl esters of substituted aromatic acids, and to processes for the manufacture thereof. More particularly, this invention relates to compounds of the formula

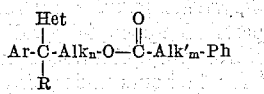

wherein Het designates a nitrogenous heterocyclic radical optionally alkylated, aralkylated, or N-oxygenated; Ar designates hydrogen or an aromatic carbocyclic radical optionally alkylated, alkoxylated, or halogenated; R designates hydrogen or a phenyl or alkyl radical; Alk and Alk′ each designate a lower alkylene or alkenylene radical; $n$ and $m$ each designate 0 or the positive integer 1; and Ph designates a halogenated, alkoxylated, carboxylated, carboalkoxylated, nitrated, or dialkylaminated phenyl radical.

Among the cyclic amino radicals represented by Het in the foregoing formula are pyridyl, piperidyl, pyrrolidyl, quinolyl, and tetrahydroquinolyl groupings. Of these groupings, those wherein the imino function is present can, in any given instance, be substituted on the nitrogen atom by oxygen or especially a lower alkyl or aralkyl radical. The lower alkyl radicals contemplated include methyl, ethyl, propyl, isopropyl, butyl, isobutyl, sec-butyl, tert-butyl, pentyl, isopentyl, tert-pentyl, neopentyl, hexyl, isohexyl, heptyl, octyl, and like $C_sH_{2s+1}$ radicals wherein $s$ is an integer amounting to less than 9. Illustrative of the aralkyl radicals occasionally present are such as benzyl and phenethyl groupings.

As to the aromatic carbocyclic radicals designated by Ar in the structural formula, these are principally phenyl or naphthyl groupings which can comprise, in place of nuclear hydrogen, 1 or more straight- or branched-chain alkyl or alkoxy radicals, or halogen, or combinations of these substituents, the alkyl and alkoxy substituents ordinarily being of lower order, which is to say embracive of fewer than 9 carbon atoms.

The lower alkylene and alkenylene radicals represented by Alk and Alk′ in the formula are bivalent acyclic straight- or branched-chain hydrocarbon moieties, saturated or containing not more than 1 double bond, and typified by methylene, ethylene, vinylene, trimethylene, propylene, 1,3-propenylene, tetramethylene, 2-methyl-1, 3-propenylene, and 2,2-dimethyl-1,3-propylene groupings. It will be recognized that when $n$ or $m$ in the formula is 0, the apposed term drops out; and when both $n$ and $m$ are 0, the compounds referred to can be depicted

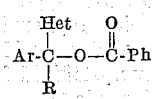

Het, Ar, R, and Ph being defined as before.

Ph in the formula unexceptionably depicts a substituted phenyl radical, as aforesaid, but the nature and number of the substituent groupings can vary within rather wide limits. Thus, Ph represents a halophenyl radical—as for example, chlorophenyl, dichlorophenyl, trichlorophenyl, and the like—and, alternatively, it represents an alkoxyphenyl radical—particularly, a (lower alkoxy)-phenyl radical, which is to say a phenyl radical wherein at least 1 and as many as several —O-lower alkyl groupings replace hydrogen. Still further, Ph represents—in particular instances—a carboxyphenyl, nitrophenyl, or di(lower alkyl)phenyl radical.

Equivalent to the basic amines of this invention for the purposes described are non-toxic acid addition and quaternary ammonium salts thereof, the compositions of which may be symbolized by

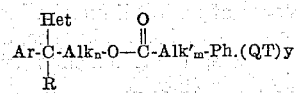

wherein Het, Ar, R, Alk, Alk′, $n$, $m$, and Ph have the meanings hereinbefore assigned; Q is selected from among hydrogen and lower alkyl, hydroxy(lower alkyl), and lower alkenyl radicals, as also such aralkyl radicals as benzyl, phenethyl, and naphthylmethyl; T is 1 equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, maleate, tartrate, citrate, gluconate, ascorbate, benzoate, cinnamate, or the like—which, in combination with the cationic portion of a salt aforesaid, is neither pharmacologically nor otherwise undesirable in pharmaceutical dosage; and $y$ is 1 except where Ph comprises an amino radical, in which case $y$ is either 1 or 2.

The application for Letters Patent securing the invention herein described and claimed is a continuation-in-part of applicant's prior copending application, Serial No. 689,273, filed October 10, 1957, and now forfeited.

The compounds herein disclosed are useful because of their valuable pharmacological properties. Thus, for example, the subject compositions are selective CNS-depressant, anorectic, spasmolytic, and fungicidal agents; and especially the trialkoxybenzoates of this invention are characterized by an unexpectedly potent and diverse tranquilizing effect on the central nervous system.

The compounds to which this invention relates are preparable by a variety of methods, but the preferred process proceeds via contact of a carbinol of the formula

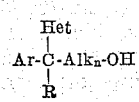

with an anhydride of the formula

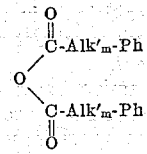

Het, Ar, R, Alk, Alk′, $n$, $m$, and Ph being selected from the previously defined groups of radicals in accordance with the particular product sought to be prepared. An inert hydrocarbon solvent may be used, or not, as desired, except that where a tertiary hydroxyl is to be esterified, both the solvent and catalytic amounts of, for example, mineral acid or an acid salt such as zinc chloride, are advisably present. Solvents commonly but, in the case of at least alcohols, unessentially employed are benzene, toluene, xylene, and the like; and a variety of catalysts may be incorporated ad libitum (with the exception as to tertiary carbinols above noted), for instance caustic, alkali metal alkoxide, pyridine or other tertiary amine, sodium acetate, etc. Water is excluded. The process is generally carried out at elevated temperatures in comparatively short periods of time, 2–5 hours at 125–160° being representative. In addition to its more general applicability, this preferred procedure leads to products of greater purity and in higher yield.

Other means of manufacturing the claimed compositions include (1) transesterification in hot hydrocarbon solvent of the carbinol

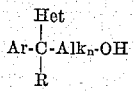

with, ordinarily, a lower alkanoate of the acid

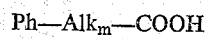

under the influence of an alkali metal alkoxide, alcoholic caustic, or a comparably basic substance, or an acid such as hydrogen chloride; (2) interaction of the carbinol aforesaid with an acid chloride

generally without solvent, but alternatively in benzene, toluene, xylene, or the like, and with anhydrous caustic alkali, or alkaline carbonate, pyridine or other tertiary base, or sodium hydride optionally present as an acid acceptor; and (3) interaction of the carbinol aforesaid with an acid

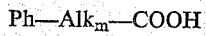

in the presence of pyridine or equivalent solvent and mediated by a hydrocarbonsulfonyl chloride, as for example, benzenesulfonyl chloride, toluenesulfonyl chloride, etc. The preparation from carbinol and acid chloride usually requires from 3 to 24 hours at temperatures ranging from 35 to 165°, 1 to 6 hours at 100–140° being preferred where no solvent or catalyst is employed.

The claimed N-alkyl and N-aralkyl compositions are derived from 4-benzoylpyridine, which is converted to the appropriate pyridinium compound by quaternization with a selected alkyl or aralkyl halide, the resultant pyridinium compound being catalytically hydrogenated to the corresponding piperidinealkanol, and this material thereupon being esterified by one of the procedures hereinbefore set forth. As variations on the foregoing preparative procedures, the N-oxido compounds hereof can be obtained by the action of an appropriate peracid on an ester of choice, as illustrated by Example 21 hereinafter; and the alkoxycarbonyl esters of the invention can be derived from corresponding carboxy compounds by esterification catalyzed with mineral acid (see Example 32). Commercially unavailable carbinol intermediates wherein the phenyl radical is alkylated or halogenated can be synthesized by combining the corresponding Grignard reagents

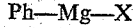

with a suitable amino aldehyde in ethereal medium and hydrolyzing the magnesium adduct so produced in aqueous acid or the equivalent.

Conversion of the amine bases of this invention to equivalent acid addition salts is accomplished by simple admixture of these compounds with any of various inorganic or strong organic acids, the anion portion of which conforms to T as hereinabove defined.

The quaternary ammonium compounds comprehended by this invention are those derived by contacting a claimed base with an organic ester of the formula

Q and T being limited by the meanings hereinbefore assigned, and it being additionally provided that Q is not hydrogen. Quaternization takes place in the temperature range between 45 and 100°, using an inert solvent such as chloroform, acetone, butanone, methanol, butanol, or the like as reaction medium. Quaternization is ordinarily completed in from 1 to 48 hours and is generally carried out in a closed system if a lower alkyl halide—such as methyl chloride—is one of the reagents. Using methyl bromide, the manufacture of quaternary salt may be smoothly effected in butanone solution at 70°, the reaction time being approximately 1 hour.

The following examples describe in detail certain of the compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade, pressures in millimeters of mercury or pounds per square inch (p.s.i.), and relative amounts of materials in parts by weight, except as otherwise noted.

*Example 1*

α-Phenyl-4-pyridinemethyl o-chlorobenzoate.—A mixture of 25 parts of α-phenyl-4-pyridinemethanol and 60 parts of o-chlorobenzoyl chloride is heated with agitation at 130–150° for 11 hours under nitrogen. The mixture is then cooled to about 30°, at which point an excess of aqueous 10% caustic is introduced. The resulting mixture is thoroughly extracted with ether, and the ether extract in turn is extracted with dilute muriatic acid. The acid extract is made basic with lye, the resulting precipitate of α-phenyl-4-pyridinemethyl o-chlorobenzoate being taken up in ether. This ether extract is dried over anhydrous potassium carbonate, filtered, and stripped of solvent by evaporation, following which the residual oil is distilled in vacuo. The pale yellow fraction coming over at 175–195° under 0.15 mm. pressure is α-phenyl-4-pyridinemethyl o-chlorobenzoate, of the formula

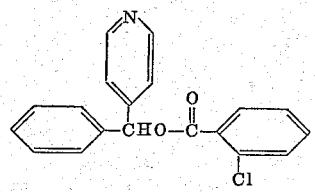

*Example 2*

α-Phenyl-4-pyridinemethyl p-chlorobenzoate.—Using essentially the technique set forth in Example 1, but substituting 60 parts of p-chlorobenzoyl chloride for the o-chlorobenzoyl chloride prescribed therein, one obtains α-phenyl-4-pyridinemethyl p-chlorobenzoate as a solid melting at approximately 68–69° when recrystallized from petroleum ether. The product has the formula

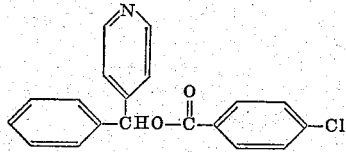

*Example 3*

α-Phenyl-2-pyridinemethyl p-chlorobenzoate.—Using essentially the technique set forth in Example 1, but substituting for the α-phenyl-4-pyridinemethanol and o-chlorobenzoyl chloride therein 37 parts of α-phenyl-2-pyridinemethanol and 60 parts of p-chlorobenzoyl chloride, respectively, one obtains α-phenyl-2-pyridinemethyl p-chlorobenzoate as a colorless solid melting at approximately 76–77° when recrystallized from petroleum ether. The product has the formula

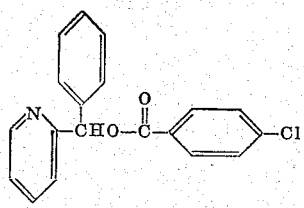

Example 4

A. 3,4,5-trichlorobenzoic anhydride.—A solution consisting of 70 parts of thionyl chloride and 25 parts of 3,4,5-trichlorobenzoic acid is heated at the boiling point under reflux for 3 hours. Excess thionyl chloride is then removed by vacuum distillation, and the residual 3,4,5-trichlorobenzoyl chloride is taken up in 100 parts of anhydrous ether. To this solution is added 25 parts of 3,4,5-trichlorobenzoic acid dissolved in 300 parts of anhydrous ether, followed cautiously and with agitation at room temperatures by 15 parts of pyridine. The desired 3,4,5-trichlorobenzoic anhydride precipitates almost instantly and is isolated by filtration. Digested with saturated aqueous sodium bicarbonate and then consecutively washed with water, methanol, and ether, the colorless product melts in the range 206–210°.

B. α - Phenyl-4-pyridinemethyl 3,4,5-trichlorobenzoate.—A mixture of 21 parts of 3,4,5-trichlorobenzoic anhydride, 9 parts of α-phenyl-4-pyridinemethanol, and 450 parts of xylene is heated to boiling and sufficient solvent distilled off to remove any traces of moisture present. Boiling is then maintained under reflux for approximately 6 hours, at which point the reaction mixture is filtered, and the filtrate thereupon washed with aqueous alkali. Solvent is evaporated under reduced pressures, affording as the residue α-phenyl-4-pyridinemethyl 3,4,5-trichlorobenzoate. The product has the formula

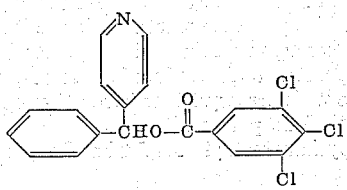

C. α - Phenyl-4-pyridinemethyl 3,4,5-trichlorobenzoate hydrochloride.—An anhydrous ether solution of α-phenyl-4-pyridinemethyl 3,4,5-trichlorobenzoate is acidified with a slight excess of hydrogen chloride dissolved in absolute 2-propanol. The precipitate thrown down is recovered on a filter, washed thereon with ether, and finally dried in air. Crystallized from a mixture of ethanol and ether, the α-phenyl-4-pyridinemethyl 3,4,5-trichlorobenzoate hydrochloride so produced melts at 205–207°.

Example 5

α-Phenyl-4-pyridinemethyl o-methoxybenzoate.—Using essentially the technique set forth in Example 1, but substituting for the 25 parts of α-phenyl-4-pyridinemethanol and 60 parts of o-chlorobenzoyl chloride therein 45 parts of α-phenyl-4-pyridinemethanol and approximately 73 parts of o-methoxybenzoyl chloride, respectively, and cutting the reaction time to 2 hours, there is obtained α-phenyl-4-pyridinemethyl o-methoxybenzoate, boiling in the range 180–215° under 0.8 mm. pressure. The product has the formula

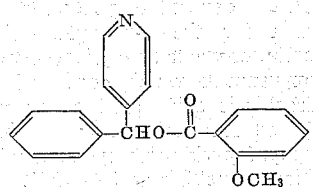

Example 6

α-Phenyl-4-pyridinemethyl p-methoxybenzoate.—Using essentially the technique set forth in Example 5, but substituting 73 parts of p-methoxybenzoyl chloride for the o-methoxybenzoyl chloride called for therein, there is obtained α - phenyl-4-pyridinemethyl p-methoxybenzoate, which boils in the range 185–205° at 0.3 mm. pressure. The product solidifies on standing and melts at 94–96°. It has the formula

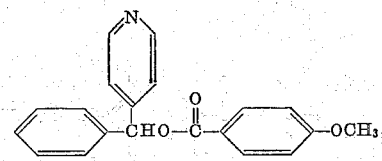

Example 7

α - Phenyl-4-pyridinemethyl p-ethoxybenzoate.—Using essentially the technique set forth in Example 1, but substituting 60 parts of p-ethoxybenzoyl chloride for the o-chlorobenzoyl chloride therein, and cutting the reaction time to 3 hours, one obtains α-phenyl-4-pyridinemethyl p-ethoxybenzoate, which boils in the range 195–200° at 0.3 mm. pressure. The product solidifies on standing and melts at 96–99°. It has the formula

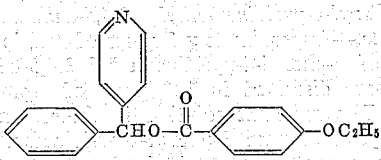

Example 8

α-Phenyl-4-pyridinemethyl p-methoxyphenylacetate.—Using essentially the technique set forth in Example 5, but substituting 120 parts of p-methoxyphenylacetyl chloride for the o-methoxybenzoyl chloride therein, one obtains α-phenyl-4-pyridinemethyl p-methoxyphenylacetate, boiling in the range 185–215° under 0.4 mm. pressure. The product has the formula

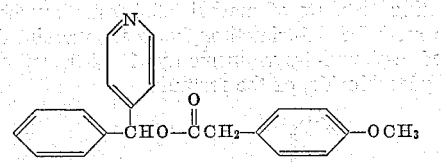

Example 9

α-Phenyl-4-pyridinemethyl 3,4-dimethoxybenzoate hydrochloride.—Using essentially the technique of Example 4B, but substituting 17 parts of veratric anhydride for the 3,4,5-trichlorobenzoic anhydride therein, one obtains α-phenyl-4-pyridinemethyl 3,4-dimethoxybenzoate, which is converted to the hydrochloride as detailed in Example 4C. α-Phenyl-4-pyridinemethyl 3,4-dimethoxybenzoate hydrochloride melts at 210–212° and has the formula

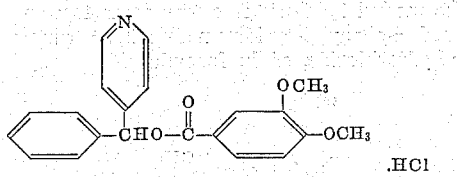

Example 10

A. α - Phenyl-4-pyridinemethyl 3,4,5-trimethoxybenzoate hydrochloride.—A mixture of 45 parts of methyl 3,4,5-trimethoxybenzoate, 37 parts of α-phenyl-4-pyridinemethanol, and 2900 parts of anhydrous xylene in the presence of excess sodium is concentrated to ⅕ volume by distillation under a nitrogen atmosphere during approximately 7 hours. From the reaction mixture, at room temperatures, is filtered a brown granular solid. The filtrate is diluted with 350 parts of anhydrous ether and then made acid with a bare excess of hydrogen chloride dissolved in absolute 2-propanol. The white precipitate which is thrown down is recovered on a filter, washed thereon with ether, next washed by suspension in cold water, and finally dried in air at approximately 80°. This material is α-phenyl-4-pyridinemethyl 3,4,5-trimethoxybenzoate hydrochloride, crystallizable from a mixture of ethanol and anhydrous ether, and which melts at approximately 219–220°. The product has the formula

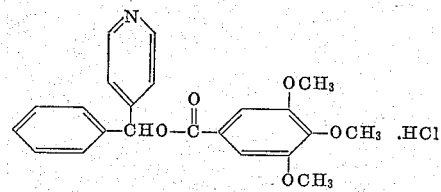

B. α-*Phenyl-4-pyridinemethyl 3,4,5-trimethoxybenzoate.*—An aqueous solution of α-phenyl-4-pyridinemethyl 3,4,5-trimethoxybenzoate hydrochloride is made alkaline. Extraction of the resultant mixture with ether and drying of the ether extract over anhydrous potassium carbonate, followed by evaporation of the solvent, affords α-phenyl-4-pyridinemethyl 3,4,5-trimethoxybenzoate as a colorless oil which crystallizes to a waxen solid on standing. The water-free product melts at approximately 118–120°.

C. α-*Phenyl-4-pyridinemethyl 3,4,5-trimethoxybenzoate maleate.*—Approximately 3 parts of maleic acid and 10 parts of α-phenyl-4-pyridinemethyl 3,4,5-trimethoxybenzoate are dissolved in 120 parts of 2-propanol by heating. The resultant solution is chilled and seeded with a crystal of pure α-phenyl-4-pyridinemethyl 3,4,5-trimethoxybenzoate maleate obtained by diluting a sample of the hot solution with cyclohexane and maintaining this mixture in the cold. Copious precipitation of the maleate occurs. The desired salt is isolated by filtration. It melts at 117–119° with gas evolution.

*Example 11*

α-*Phenyl-4-pyridinemethyl 2,3,4-trimethoxybenzoate hydrochloride.*—Using the technique of Example 10A, but substituting 45 parts of methyl 2,3,4-trimethoxybenzoate for the methyl 3,4,5-trimethoxybenzoate therein, there is obtained α-phenyl-4-pyridinemethyl 2,3,4-trimethoxybenzoate hydrochloride, of the formula

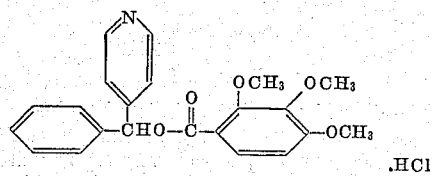

*Example 12*

α-*Phenyl-4-pyridinemethyl 2,4,6-trimethoxybenzoate hydrochloride.*—Using the technique of Example 10A, but substituting 45 parts of methyl 2,4,6-trimethoxybenzoate for the methyl 3,4,5-trimethoxybenzoate therein, there is obtained α-phenyl-4-pyridinemethyl 2,4,6-trimethoxybenzoate hydrochloride, of the formula

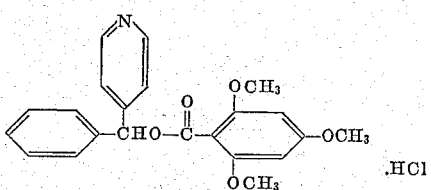

*Example 13*

α-*Phenyl-4-pyridinemethyl 3,4,5-triethoxybenzoate hydrochloride.*—A mixture of 55 parts of 3,4,5-triethoxybenzoyl chloride, 37 parts of α-phenyl-4-pyridinemethanol, 20 parts of triethylamine, and 1350 parts of anhydrous xylene is heated with agitation at the boiling point under reflux in an atmosphere of nitrogen for 22 hours. The mixture is then cooled, freed of precipitate by filtration, and made acid with hydrogen chloride dissolved in anhydrous 2-propanol. A second precipitate is thrown down, this material likewise being removed by filtration. The filtrate from this operation is stripped of solvent by evaporation, whereupon the residue is taken up in dilute aqueous muriatic acid. The resultant solution is washed with ether and then made alkaline, producing an oil-and-water mixture which is extracted with ether. The ether extract is dried over anhydrous sodium sulfate, treated with decolorizing charcoal, and finally evaporated to a viscous dark brown oil. Distillation of the oil at 0.3 mm. pressure and 160° vapor temperature serves to remove 4-benzoylpyridine present as a by-product. The residue is taken up in hot absolute ethanol, and the resultant solution is made acid with hydrogen chloride dissolved in absolute 2-propanol. Upon addition of anhydrous ether, a granular ivory precipitate is thrown down. This material is α-phenyl-4-pyridinemethyl 3,4,5-triethoxybenzoate hydrochloride, the melting point of which is 202–204°. The product has the formula

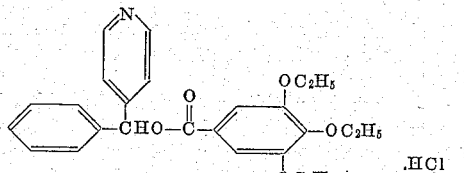

*Example 14*

A. α-*Phenyl-2-pyridinemethyl 3,4,5-trimethoxybonzoate.*—A mixture of 20 parts of 3,4,5-trimethoxybonzoic anhydride, 9 parts of α-phenyl-2-pyridinemethanol, and 450 parts of xylene is heated to boiling and sufficient solvent distilled off to remove any traces of moisture present. Boiling is then maintained under reflux for approximately 6 hours, at which point the reaction mixture is filtered, and the filtrate thereupon washed with aqueous alkali. Solvent is evaporated under reduced pressures, affording a solid residue which, recrystallized from 2-propanol, melts at 115–116°. The pure white material thus obtained is α-phenyl-2-pyridinemethyl 3,4,5-trimethoxybenzoate, of the formula

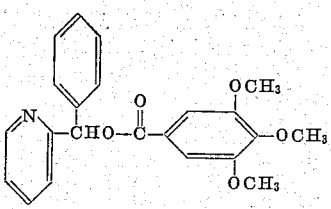

B. α-*Phenyl-2-pyridinemethyl 3,4,5-trimethoxybenzoate hydrochloride.*—An anhydrous ether solution of α-phenyl-2-pyridinemethyl 3,4,5-trimethoxybenzoate is acidified with a slight excess of hydrogen chloride dissolved in absolute 2-propanol. The precipitate thrown down is recovered on a filter, washed thereon with ether, and finally dried in air. Crystallized from a mixture of ethanol and ether, the α-phenyl-2-pyridinemethyl 3,4,5-trimethoxybenzoate hydrochloride so produced melts at 172.5–174°.

*Example 15*

α-*Phenyl-3-pyridinemethyl 3,4,5-trimethoxybenzoate hydrochloride.*—Using essentially the technique set forth in Example 14A, but substituting 10 parts of α-phenyl-3-pyridinemethanol for the α-phenyl-2-pyridinemethanol prescribed therein, one obtains α-phenyl-3-pyridinemethyl 3,4,5-trimethoxybenzoate which, converted to the corresponding hydrochloric acid addition salt as detailed in Example 14B and recrystallized from ethanol, affords colorless α-phenyl-3-pyridinemethyl 3,4,5-trimethoxybenzoate hydrochloride melting at 192–194°. The product has the formula

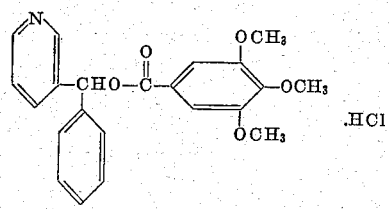

Example 16

β-Phenyl-4-pyridineethyl 3,4,5 - trimethoxybenzoate.—Using the technique of Example 14A, but substituting 10 parts of β-phenyl-4-pyridineethanol [prepared according to Tschitschibabin, J. prakt. Chem., 69, 315] for the α-phenyl-2-pyridinemethanol prescribed therein, one obtains β-phenyl-4-pyridineethyl 3,4,5-trimethoxybenzoate, which has the formula

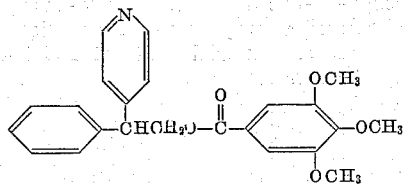

Example 17

γ-Phenyl-4-pyridinepropyl 3,4,5-trimethoxybenzoate.—Using essentially the technique of Example 14A, but substituting 11 parts of γ-phenyl-4-pyridinepropanol for the α-phenyl-2-pyridinemethanol prescribed therein, one obtains γ-phenyl-4-pyridinepropyl 3,4,5-trimethoxybenzoate, of the formula

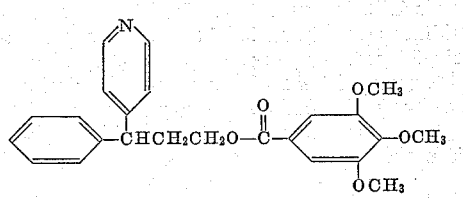

Example 18

α-Phenyl-4-pyridinemethyl 3,4,5-trimethoxyphenylacetate hydrochloride.—Using the technique of Example 10A, but substituting 47 parts of methyl 3,4,5-trimethoxyphenylacetate for the methyl 3,4,5-trimethoxybenzoate therein, one obtains α-phenyl-4-pyridinemethyl 3,4,5-trimethoxyphenylacetate hydrochloride, melting at approximately 182° (with gas evolution). The product has the formula

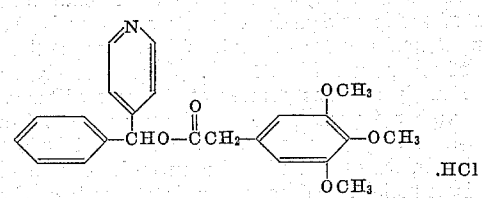

Example 19

α-Phenyl-4-pyridinemethyl 3-(3,4,5-trimethoxyphenyl)-propionate.—Using essentially the technique set forth in Example 1, but substituting 52 parts of 3-(3,4,5-trimethoxyphenyl)propionyl chloride [prepared according to Slotta and Heller, Ber., 63, 3042 (1930)], for the o-chlorobenzoyl chloride prescribed therein, one obtains α-phenyl - 4 - pyridinemethyl 3-(3,4,5-trimethoxyphenyl)-propionate, of the formula

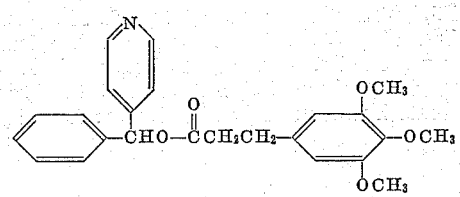

Example 20

α-Phenyl-4-pyridinemethyl 3,4,5 - trimethoxycinnamate hydrochloride.—Using the technique of Example 10A, but substituting 51 parts of methyl 3,4,5-trimethoxycinnamate for the methyl 3,4,5-trimethoxybenzoate therein, one obtains α-phenyl-4-pyridinemethyl 3,4,5-trimethoxycinnamate hydrochloride, which melts at approximately 200–201° (with gas evolution). The product has the formula

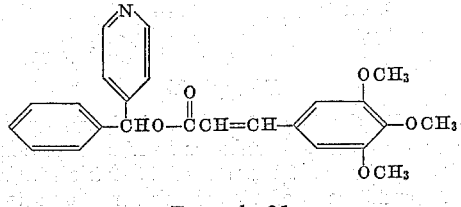

Example 21

α-Phenyl-4-pyridinemethyl 3,4,5-trimethoxybenzoate N-oxide.—A mixture of 100 parts of α-phenyl-4-pyridinemethyl 3,4,5-trimethoxybenzoate with 56 parts of perbenzoic acid dissolved in 400 parts of benzene, protected from light, is maintained at room temperatures for 24 hours. The resulting solution is washed free of organic acids with aqueous 5% caustic, dried over anhydrous potassium carbonate, and stripped of solvent by vacuum distillation. The pale yellow viscous oil which remains is the desired α-phenyl-4-pyridinemethyl 3,4,5-trimethoxybenzoate N-oxide, which is characterized by an absorption band in the infrared spectrum at 6.72μ. The product has the formula

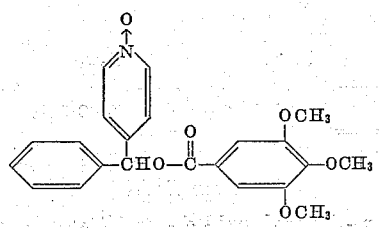

Example 22

A. α-m-Tolyl-4-pyridinemethanol.—To a suspension of 243 parts of magnesium in 140 parts of anhydrous ether is added, with agitation, a solution of 171 parts of m-bromotoluene in 560 parts of anhydrous ether. The resultant mixture is heated at the boiling point under reflux for one hour, whereupon a solution of 107 parts of pyridine-4-aldehyde in 140 parts of anhydrous ether is cautiously introduced. Boiling under reflux is maintained overnight, after which the reaction mixture is decomposed with saturated aqueous ammonium chloride. Extraction with dilute aqueous muriatic acid serves to remove the desired amino alcohol in the form of the hydrochloric acid salt, which is converted to the free base by alkalization with potassium carbonate. The α-m-tolyl-4-pyridinemethanol thus thrown down is purified by recrystallization from benzene. The product melts at 147–150°.

B. α - m - Tolyl - 4 - pyridinemethyl 3,4,5 - trimethoxybenzoate hydrochloride.—A mixture of 20 parts of α-m-tolyl-4-pyridinemethanol and 28 parts of 3,4,5-trimethoxybenzoyl chloride is heated with agitation at 130–140° for 3½ hours under nitrogen. The mixture is then cooled to about 60°, at which point an excess of aqueous 10% caustic is introduced. The resulting mixture is thoroughly extracted with ether, and the ether extract in turn is extracted with dilute muriatic acid. This acid solution is made basic with potash, the resulting precipitate of α-m-tolyl-4-pyridinemethyl 3,4,5-trimethoxybenzoate being taken up in ether. To the ether extract is added a slight excess of hydrogen chloride dissolved in 2-propanol. The α-m-tolyl-4-pyridinemethyl 3,4,5-trimethoxybenzoate hydrochloride which is thrown down is filtered off and further purified by recrystallization from a mixture of absolute ethanol and ether. The product melts at 200–202° and has the formula

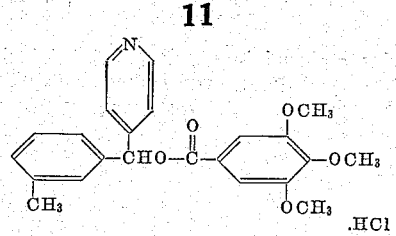

*Example 23*

α - m - Tolyl - 4 - pyridinemethyl 3,4,5-triethoxybenzoate hydrochloride.—A mixture of 15 parts of α-m-tolyl-4-pyridinemethanol, 22 parts of 3,4,5-triethoxybenzoyl chloride, and 8 parts of triethylamine in 900 parts of anhydrous xylene is heated at the boiling point of the solvent under reflux in an atmosphere of nitrogen during 24 hours. The reaction mixture is then cooled to room temperatures and filtered. To the filtrate is added an excess of hydrogen chloride dissolved in 2-propanol. Evaporation of solvent by vacuum distillation leaves a residue which is taken up in hot benzene. Upon cooling of the benzene solution, there is precipitated a mixture of salts which is recovered by filtration and resolved by suspension in hot water. The material which remains undissolved is the desired α-m-tolyl-4-pyridinemethyl 3,4,5-triethoxybenzoate hydrochloride which, recrystallized from absolute ethanol, melts at 207–210°. The product has the formula

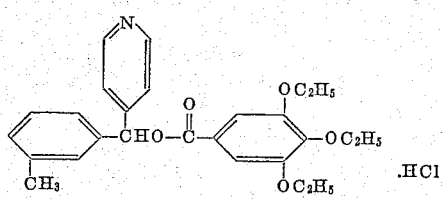

*Example 24*

A. α - p - Ethylphenyl - 4 - pyridinemethanol.—Using the technique of Example 22A, but substituting 184 parts of p-bromoethylbenzene for the m-bromotoluene therein, there is obtained α-p-ethylphenyl-4-pyridinemethanol.

B. α - p - Ethylphenyl - 4 - pyridinemethyl 3,4,5 - triethoxybenzoate hydrochloride.—Using the technique of Example 23, but substituting 16 parts of α-p-ethylphenyl-4-pyridinemethanol for the α-m-tolyl-4-pyridinemethanol therein, there is obtained α-p-ethylphenyl-4-pyridinemethyl 3,4,5-triethoxybenzoate hydrochloride, of the formula

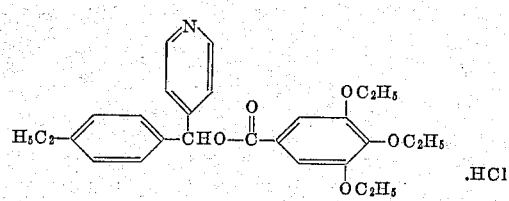

*Example 25*

A. α - m - Chlorophenyl - 4 - pyridinemethanol.—Using the technique of Example 22A, but substituting 192 parts of m-bromochlorobenzene for the m-bromotoluene therein, there is obtained α-m-chlorophenyl-4-pyridinemethanol. This material melts at 133–135°.

B. α - m - Chlorophenyl - 4 - pyridinemethyl 3,4,5-trimethoxybenzoate hydrochloride.—To a solution of 33 parts of α-m-chlorophenyl-4-pyridinemethanol in 450 parts of anhydrous toluene is added, portionwise with agitation at 80–90° under a nitrogen atmosphere, 4 parts of sodium hydride. Heating at the prescribed temperatures is continued for 1 hour, whereupon a solution of approximately 43 parts of 3,4,5-trimethoxybenzoyl chloride in 180 parts of anhydrous toluene is introduced during 10 minutes. The resulting mixture is maintained at 80° overnight, at which point 16 parts of methanol is cautiously added to destroy excess hydride. After being washed with sufficient dilute aqueous muriatic acid to remove unreacted amino alcohol, the mixture is dried over calcium sulfate and evaporated to dryness. The residue is extracted with hot benzene, from which on cooling a further amount of unreacted amino alcohol is precipitated. This is filtered off, and an excess of hydrogen chloride dissolved in 2-propanol is added to the hot filtrate. From the filtrate, on cooling, the desired α-m-chlorophenyl - 4 - pyridinemethyl 3,4,5 - trimethoxybenzoate hydrochloride precipitates. Recrystallized from absolute ethanol, the material melts at 204–206°. The product has the formula

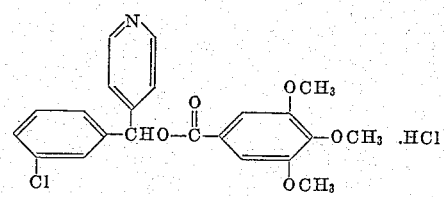

*Example 26*

α - o - Chlorophenyl - 4 - pyridinemethyl 3,4,5 - triethoxybenzoate hydrochloride.—Using the technique of Example 25B, but substituting for the α-m-chlorophenyl-4-pyridinemethanol and 3,4,5-trimethoxybenzoyl chloride therein 33 parts of α-o-chlorophenyl-4-pyridinemethanol and 45 parts of 3,4,5-triethoxybenzoyl chloride, respectively, there is obtained α-o-chlorophenyl-4-pyridinemethyl 3,4,5-triethoxybenzoate hydrochloride, which has the formula

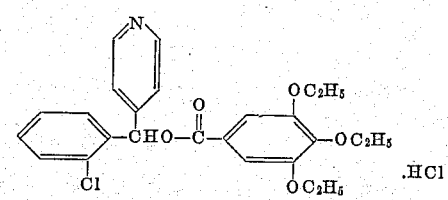

*Example 27*

A. α-Phenyl-4-piperidinemethanol.—A solution of 110 parts of α-phenyl-4-pyridinemethanol in a mixture of 660 parts of acetic acid and 220 parts of water is agitated during 9 hours under 45 p.s.i. of hydrogen in the presence of platinum oxide catalyst. Approximately 4 parts of the catalyst is incorporated at the start of the reduction, another 4 parts being introduced at the end of the first 3 hours. Temperatures rise to around 35° in process. When the uptake of hydrogen indicates that reduction is complete, hydrogenation is stopped, catalyst is filtered off, and acetic acid is stripped from the filtrate by vacuum distillation. The residue is taken up in water, and the resultant solution made alkaline with caustic soda. The solid precipitate thrown down is isolated by filtration and further purified by recrystallization from absolute ethanol. The desired α-phenyl-4-piperidinemethanol is obtained by this means as a white powder melting at approximately 168–169°.

B. α - Phenyl - 4 - piperidinemethyl 3,4,5 - trimethoxybenzoate hydrochloride.—A mixture of 23 parts of methyl 3,4,5-trimethoxybenzoate, 19 parts of α-phenyl-4-piperidinemethanol, and 2 parts of sodium in xylene medium is processed substantially as described in Example 10A to give α-phenyl-4-piperidinemethyl 3,4,5-trimethoxybenzoate hydrochloride, which has the formula

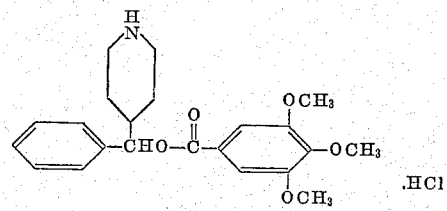

C. α - Phenyl - 4 - piperidinemethyl 3,4,5 - trimethoxybenzoate.—The hydrochloric acid salt of the foregoing Part B of this example is converted to the corresponding base by alkalization in aqueous solution, the α-phenyl-4-piperidinemethyl 3,4,5-trimethoxybenzoate thus produced being isolated by extraction into ether and subsequent evaporation of solvent as described in Example 10B.

Example 28

A. 4-benzoyl-1-methylpyridinium iodide.—A mixture of 18 parts of 4-benzoylpyridine and 30 parts of methyl iodide in 400 parts of water-washed chloroform is heated at the boiling point under reflux overnight. Solvent is then stripped in vacuo at elevated temperatures, leaving as a residue 4-benzoyl-1-methylpyridinium iodide.

B. 1 - methyl - α - phenyl - 4 - piperidinemethanol.—A mixture of 15 parts of 4-benzoyl-1-methylpyridinium iodide, 1 part of platinum oxide, and 175 parts of absolute ethanol is hydrogenated under pressures of the order of 50 p.s.i. until the uptake of hydrogen gas is consistent with the reduction in prospect. Catalyst is then filtered off and the filtrate distilled to remove solvent present. The residue is 1-methyl-α-phenyl-4-piperidinemethanol hydroiodide, which is converted to the corresponding base by dissolution in water and neutralization of this solution with aqueous sodium bicarbonate. The base is isolated by extraction into ether and distillation of solvent from the ether extract.

C. 1 - methyl - α - phenyl - 4 - piperidinemethyl 3,4,5-trimethoxybenzoate.—A mixture of 21 parts of 1-methyl-α-phenyl-4-piperidinemethanol, 23 parts of 3,4,5-trimethoxybenzoyl chloride, and 165 parts of dry benzene is heated at the boiling point under reflux for 24 hours, then cooled and filtered. The filtrate is thoroughly mixed with an excess of dilute aqueous muriatic acid, following which the benzene phase is discarded and excess aqueous caustic soda is stirred in. Sufficient potassium carbonate to insure saturation is next incorporated, following which the mixture is extracted with ether. Evaporation of solvent from the ether extract affords as a residue the desired 1-methyl-α-phenyl-4-piperidinemethyl 3,4,5-trimethoxybenzoate, which has the formula

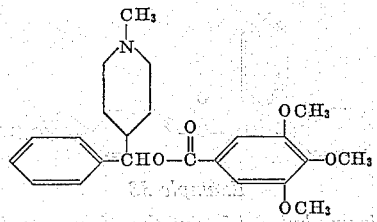

Example 29

1-octyl-α-phenyl-4-piperidinemethyl 3,4,5 - trimethoxybenzoate.—Using the procedures detailed in the preceding Example 28, 4-benzoylpyridine and octyl iodide are reacted together in chloroform solution to give 4-benzoyl-1-octylpyridinium iodide, which is converted via low pressure hydrogenation in the presence of platinum oxide catalyst to 1-octyl-α-phenyl-4-piperidinemethanol. This material, in turn, is esterified with 3,4,5-trimethoxybenzoyl chloride; and there is thus obtained 1-octyl-α-phenyl-4-piperidinemethyl 3,4,5-trimethoxybenzoate, of the formula

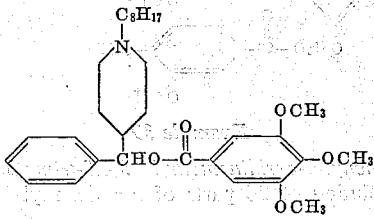

Example 30

A. 4-benzoyl-1-benzylpyridinium chloride.—A solution of 37 parts of 4-benzoylpyridine and 65 parts of benzyl chloride in 750 parts of chloroform is heated at the boiling point under reflux for 26 hours. The solvent is then evaporated by vacuum distillation, whereupon the residue is crystallized from butanone to give pure white 4-benzoyl-1-benzylpyridinium chloride, the melting point of which is approximately 193–194°.

B. 1-benzyl-α-phenyl-4-piperidinemethanol hydrochloride.—A mixture of 16 parts of 4-benzoyl-1-benzylpyridinium chloride, 1 part of platinum oxide and 160 parts of absolute ethanol is hydrogenated under pressures of the order of 50 p.s.i. When the uptake of hydrogen indicates that the desired reduction is achieved, hydrogenation is stopped and the reaction mixture is filtered to remove catalyst. Stripping of solvent from the filtrate by vacuum distillation leaves a light brown oil which solidifies to an ecru crystalline solid on standing. This solid is recrystallized from a mixture of absolute ethanol and anhydrous ether to give a pure white material melting at 190–193°. The product thus obtained is 1-benzyl-α-phenyl-4-piperidinemethanol hydrochloride.

C. 1-benzyl-α-phenyl-4-piperidinemethyl 3,4,5-trimethoxybenzoate hydrobromide.—A suspension of 25 parts of 1-benzyl-α-phenyl-4-piperidinemethanol hydrochloride in 200 parts of benzene is thoroughly mixed with an excess of dilute aqueous potassium carbonate. The benzene phase is then separated and dried by azeotropic distillation. The weight of benzene present is adjusted to approximate 8 times that of amino alcohol, whereupon 19 parts of 3,4,5-trimethoxybenzoyl chloride dissolved in 200 parts of benzene is incorporated. The mixture is heated at the boiling point under reflux for 26 hours. Precipitation occurs within a few minutes. The reaction mixture is cooled and filtered, and the filtrate is thoroughly mixed with an excess of dilute aqueous muriatic acid. A heavy water-insoluble oil is thrown down; and this oil, together with the aqueous phase is made basic with caustic soda. The resultant mixture is saturated with potassium carbonate and then extracted with ether. The ether extract is dried over anhydrous potassium carbonate and then filtered and evaporated. There remains a "glass" which is taken up in ether. The ether solution is filtered to remove small amounts of insoluble flocculent material, following which it is made acid with alcoholic hydrogen bromide. The semi-solid hydrobromic acid salt which results is separated and recrystallized from a mixture of absolute ethanol and ether. The 1-benzyl-α-phenyl-4-piperidinemethyl 3,4,5-trimethoxybenzoate hydrobromide thus obtained is a white powder melting at 227–230°. The product has the formula

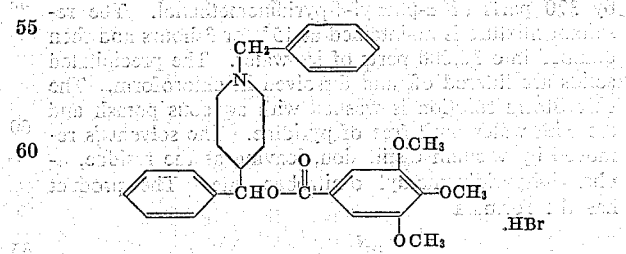

Example 31

α-phenyl-4-pyridinemethyl o-carboxybenzoate.—Using essentially the technique of Example 14A, but substituting for the 3,4,5-trimethoxybenzoic anhydride and α-phenyl-2-pyridinemethanol therein approximately 8 parts of phthalic anhydride and 9 parts of α-phenyl-4-pyridinemethanol, respectively, there is obtained α-phenyl-4-pyridinemethyl o-carboxybenzoate, which melts at approximately 201–202°. The product has the formula

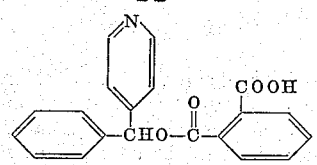

*Example 32*

α-Phenyl-4-pyridinemethyl o-methoxycarbonylbenzoate hydrochloride.—To a solution of 15 parts of hydrogen chloride and 200 parts of methanol is added 12 parts of α-phenyl-4-pyridinemethyl o-carboxybenzoate. The resultant mixture is heated at the boiling point under reflux for 2 hours, then concentrated to approximately ¼ volume by vacuum distillation. Addition of ether to the warm residue precipitate α-phenyl-4-pyridinemethyl o-methoxycarbonylbenzoate hydrochloride as a granular white solid, which melts at 96–99°. The product has the formula

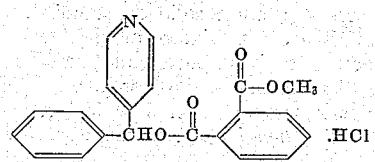

*Example 33*

α-Phenyl-4-pyridinemethyl p-ethoxycarbonylbenzoate.—A mixture of 37 parts of α-phenyl-4-pyridinemethanol, approximately 43 parts of p-ethoxycarbonylbenzoyl chloride, and 500 parts of pyridine is heated at the boiling point under reflux for one hour. The pyridine is then removed by vacuum distillation, whereupon the residue is washed with aqueous 10% caustic and then extracted with ether. The ether extract in turn is extracted with aqueous 5% muriatic acid. The acid extract is made alkaline, and the resultant mixture is extracted with ether. This ether extract is dried over anhydrous potassium carbonate and then stripped of solvent by distillation. The residual golden oil is α-phenyl-4-pyridinemethyl p-ethoxycarbonylbenzoate, of the formula

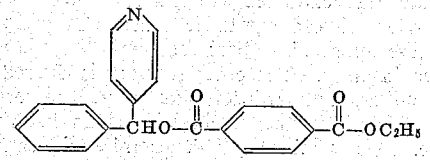

*Example 34*

α-Phenyl-4-pyridinemethyl o-nitrobenzoate.—To a suspension of 334 parts of o-nitrobenzoic acid in 4900 parts of pyridine at 15° is added 706 parts of benzenesulfonyl chloride followed, portionwise over a 15-minute period, by 370 parts of α-phenyl-4-pyridinemethanol. The resultant mixture is maintained at 15° for 3 hours and then dumped into 30,000 parts of ice-water. The precipitated solids are filtered off and dissolved in chloroform. The chloroform solution is washed with aqueous potash and the with water until free of pyridine. The solvent is removed by vacuum distillation, leaving as the residue, α-phenyl-4-pyridinemethyl o-nitrobenzoate. The product has the formula

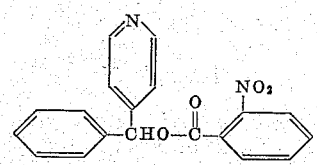

*Example 35*

α-Phenyl-4-pyridinemethyl p-nitrobenzoate hydrochloride.—Using the technique of Example 34, but substituting 334 parts of p-nitrobenzoic acid for the o-nitrobenzoic acid called for therein, one obtains α-phenyl-4-pyridinemethyl p-nitrobenzoate, which is converted to the corresponding hydrochloric acid salt by dissolution in absolute ethanol and acidification with a slight excess of hydrogen chloride dissolved in absolute 2-propanol. The product is thrown out of solution as a granular white solid by introduction of anhydrous ether. α-Phenyl-4-pyridinemethyl p-nitrobenzoate hydrochloride melts at 224–227° and has the formula

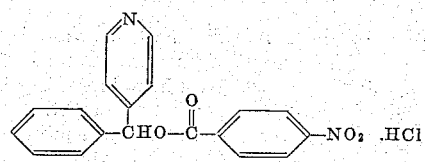

*Example 36*

α-Phenyl - 4 - pyridinemethyl m-dimethylaminobenzoate.—A mixture of 36 parts of methyl m-dimethylaminobenzoate, 37 parts of α-phenyl-4-pyridinemethanol, and 2900 parts of anhydrous xylene in the presence of excess sodium is concentrated to ⅓ volume by distillation under a nitrogen atmosphere during approximately 7 hours. From the reaction mixture, at room temperature, is filtered a brown granular solid containing the excess sodium. The filtrate, upon distillation, affords α-phenyl-4-pyridinemethyl m-dimethylaminobenzoate as a golden oil boiling at 200–210° under 0.2 mm. pressure. The product has the formula

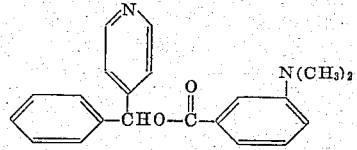

*Example 37*

α-Phenyl-4-pyridinemethyl p-diethylaminobenzoate.—Using the technique of Example 36, but substituting approximately 42 parts of methyl p-diethylaminobenzoate for the methyl m-dimethylaminobenzoate therein, one obtains α-phenyl-4-pyridinemethyl p-diethylaminobenzoate. The product has the formula

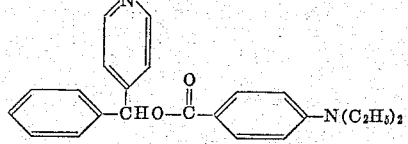

*Example 38*

4-pyridinemethyl 3,4,5-trimethoxybenzoate hydrochloride.—A solution of 31 parts of 4-pyridine methanol and 45 parts of 3,4,5-trimethoxybenzoyl chloride in 900 parts of dry xylene is heated at the boiling point under reflux for 14 hours. The solution is then cooled and filtered, and to the filtrate is added a slight excess of hydrogen chloride dissolved in 2-propanol, followed by approximately 250 parts of anhydrous ether. Precipitation of 4-pyridinemethyl 3,4,5-trimethoxybenzoate hydrochloride occurs. The product, recrystallized from ethanol, melts at approximately 210–211°. It has the formula

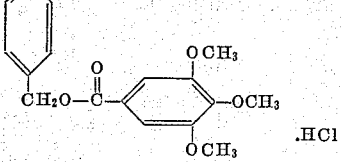

*Example 39*

α,α-Diphenyl-4-pyridinemethyl 3,4,5-trimethoxybenzoate.—A solution of 26 parts of α,α-diphenyl-4-pyridinemethanol, 40 parts of 3,4,5-trimethoxybenzoic anhydride, and 1 part of concentrated sulfuric acid in 800 parts of dry xylene is heated at the boiling point under reflux for 9 hours. The solution is then cooled and filtered. The filtrate is washed with aqueous 5% caustic, then with water, and finally is dried over anhydrous sodium sulfate. The desired α,α-diphenyl-4-pyridinemethyl 3,4,5-trimethoxybenzoate is isolated from this solution by evaporation of solvent. The product, crystallized from 2-propanol, melts at approximately 160.5–161.5°. It has the formula

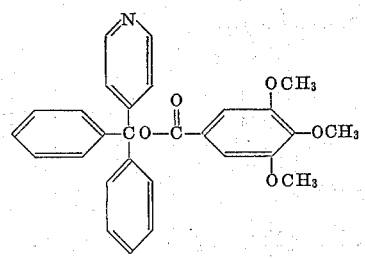

What is claimed is:

1. A compound of the formula

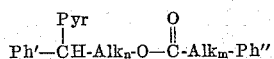

wherein Pyr is selected from the group consisting of radicals of the formulas

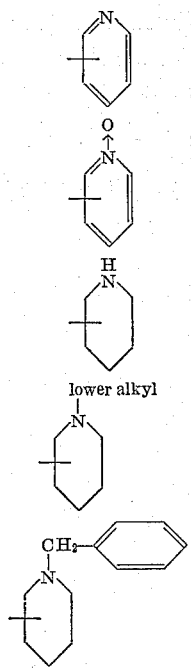

Ph' is selected from the group consisting of radicals of the formulas

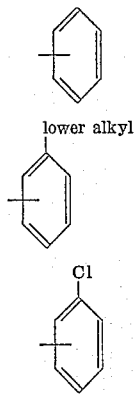

Alk$_n$ and Alk$_m$ are each selected from the group consisting of radicals of the formulas $$-CH=CH- \quad -C_xH_{2x}-$$

separating the radicals attached thereto by fewer than 5 carbon atoms, $x$ being representative of a positive integer less than 6; $n$ and $m$ are selected from the group consisting of 0 and the positive integer 1; and Ph'' is selected from the group consisting of radicals of the formulas

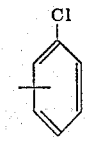
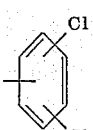
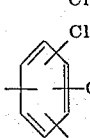
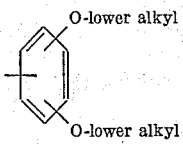
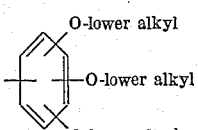
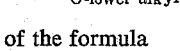
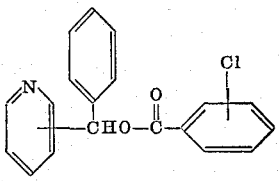

2. A compound of the formula

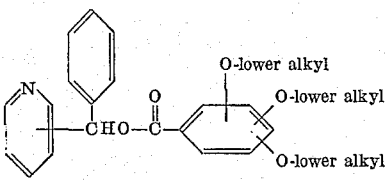

3. α-Phenyl-4-pyridinemethyl 3,4,5-trichlorobenzoate.
4. A compound of the formula

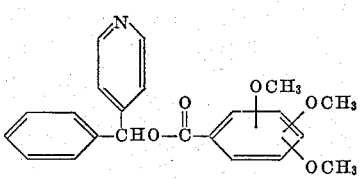

5. A compound of the formula

6. α-Phenyl-4-pyridinemethyl 3,4,5-trimethoxybenzoate.
7. A compound of the formula

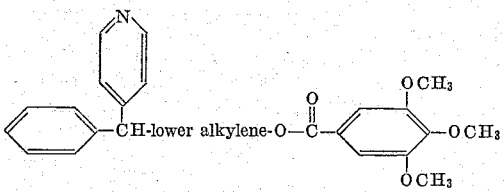

wherein the lower alkylene radical contains fewer than 3 carbon atoms.

8. γ-Phenyl-4-pyridinepropyl 3,4,5-trimethoxybenzoate.
9. A compound of the formula

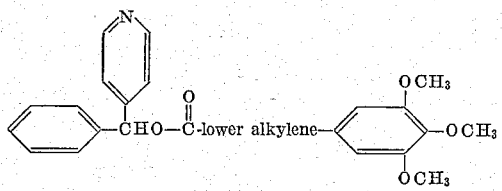

wherein the lower alkylene radical contains fewer than 3 carbon atoms.

10. α-Phenyl-4-pyridinemethyl 3,4,5-trimethoxyphenylacetate.
11. α-Phenyl-4-pyridinemethyl 3,4,5-trimethoxycinnamate.
12. α-Phenyl-4-pyridinemethyl 3,4,5-trimethoxybenzoate N-oxide.
13. A compound of the formula

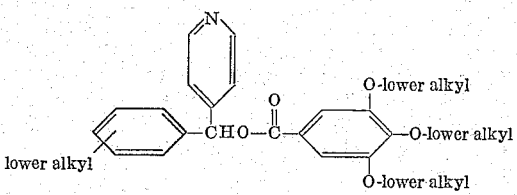

14. α-m-Tolyl-4-pyridinemethyl 3,4,5-trimethoxybenzoate.
15. A compound of the formula

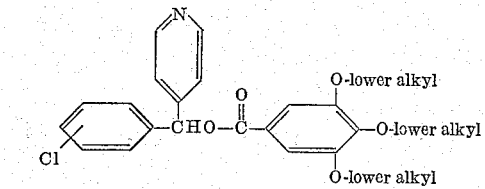

16. α-m-Chlorophenyl-4-pyridinemethyl 3,4,5-trimethoxybenzoate.

References Cited in the file of this patent

UNITED STATES PATENTS

| | | |
|---|---|---|
| 2,899,437 | Shapiro et al. | Aug. 11, 1959 |
| 2,907,764 | Voegtli et al. | Oct. 6, 1959 |

FOREIGN PATENTS

| | | |
|---|---|---|
| 920,491 | France | Jan. 4, 1947 |

OTHER REFERENCES

Karrer: "Organic Chemistry" (4th Eng. ed.), page 222 (1950).

Kharasch et al.: J. Org. Chem., volume 18, pages 1051–4 (1953).

Boyer et al.: J. Am. Chem. Soc., volume 80, pages 2741–3, June 1958.